W. H. LYNN.
COTTON CHOPPING MACHINE.
APPLICATION FILED DEC. 29, 1910.
999,815.
Patented Aug. 8, 1911.
3 SHEETS—SHEET 1.
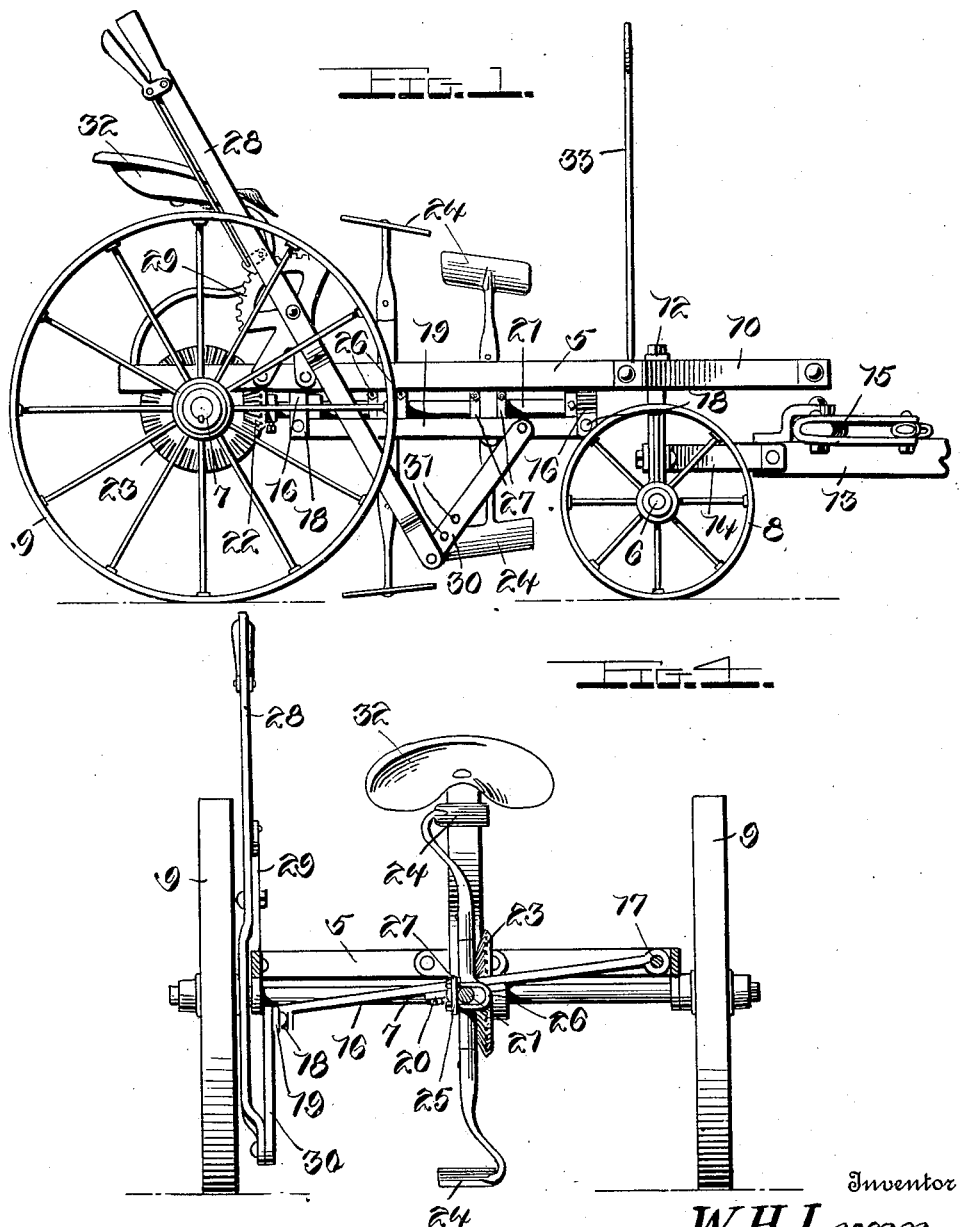
Witnesses
Chas. L. Griesbauer.
M. F. Rieder.
Inventor
W. H. Lynn.
By Watson E. Coleman.
Attorney W. H. LYNN.
COTTON CHOPPING MACHINE.
APPLICATION FILED DEC. 29, 1910.
999,815.
Patented Aug. 8, 1911.
3 SHEETS—SHEET 2.
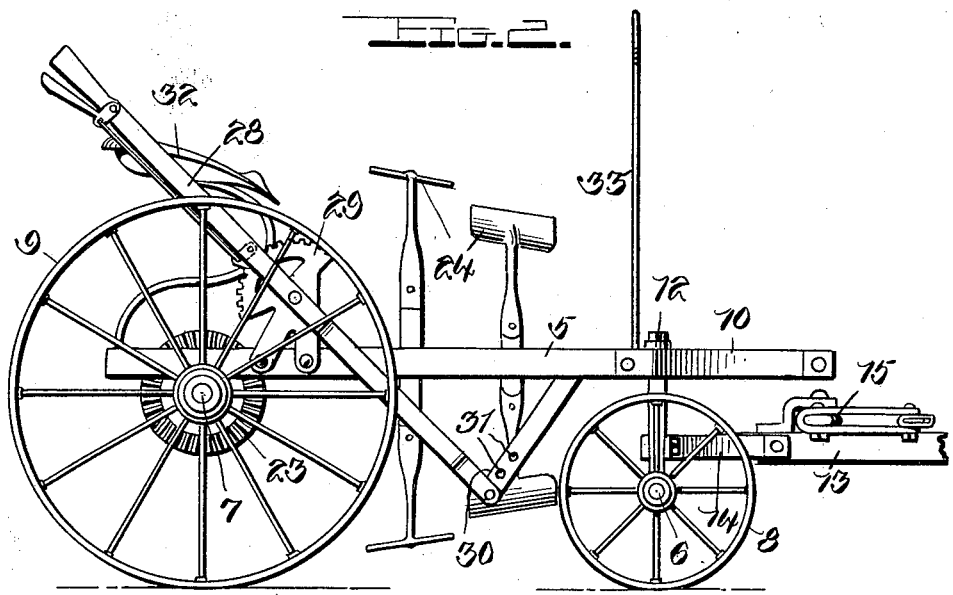
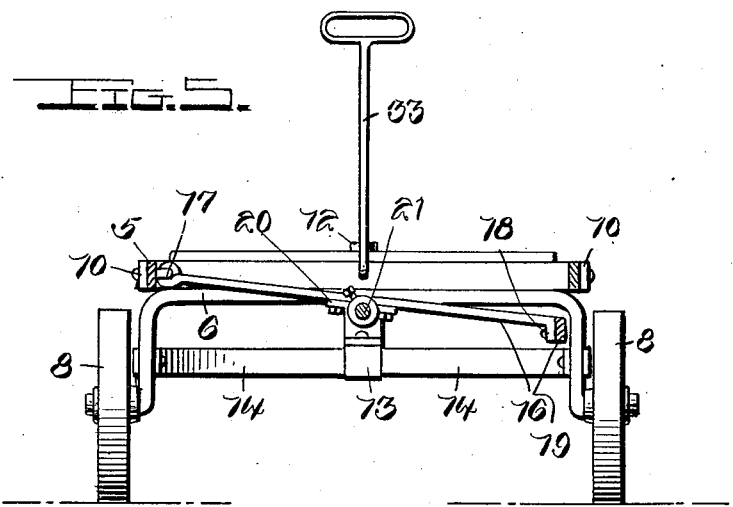
Witnesses
Chas. L. Grieshauer.
H. F. Reber.
Inventor
W. H. Lynn.
By Watson E. Coleman
Attorney
COLUMBIA PLANOGRAPH CO., WASHINGTON, D. C.

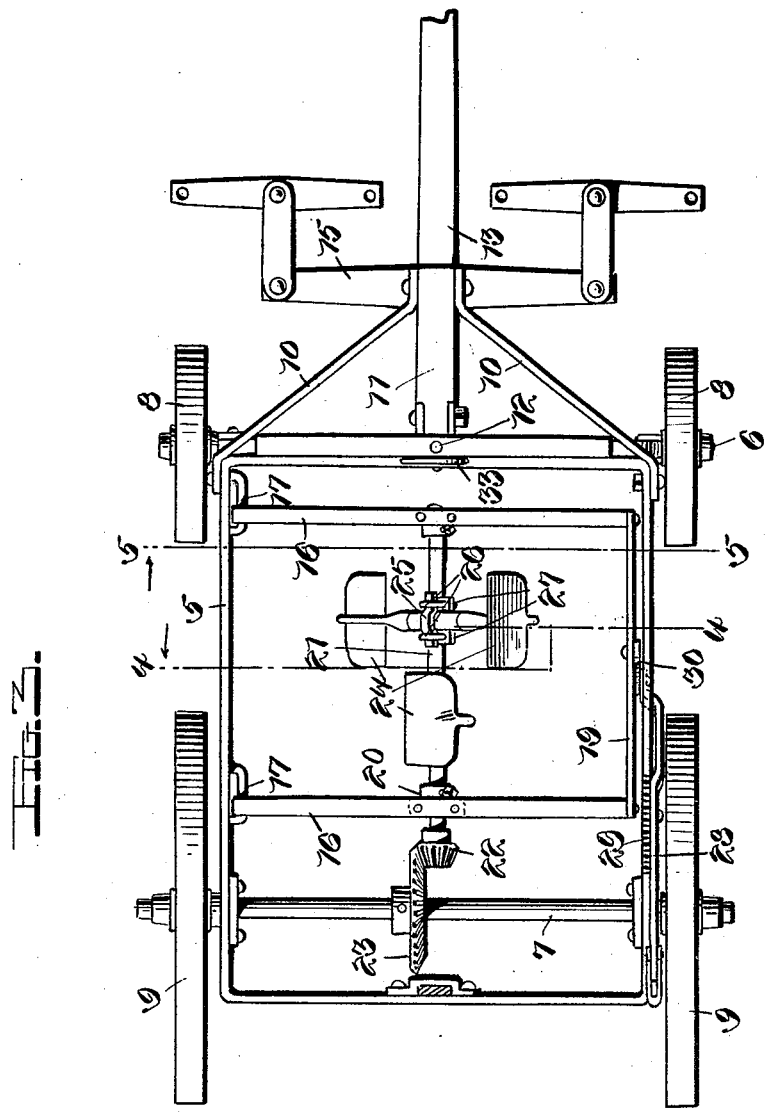

UNITED STATES PATENT OFFICE.

WALTER HUGH LYNN, OF STOCKDALE, TEXAS.

COTTON-CHOPPING MACHINE.

999,815.  Specification of Letters Patent.  Patented Aug. 8, 1911.

Application filed December 29, 1910. Serial No. 599,826.

*To all whom it may concern:*

Be it known that I, WALTER HUGH LYNN, a citizen of the United States, residing at Stockdale, in the county of Wilson and State of Texas, have invented certain new and useful Improvements in Cotton-Chopping Machines, of which the following is a specification, reference being had to the accompanying drawings.

This invention relates to improvements in cotton chopping machines and has for its object to provide a machine of comparatively simple construction and means whereby the chopping hoes may be easily and quickly thrown into and out of operation.

A further object of the invention is to provide a main wheel supported frame, a hoe carrying frame movably mounted in the main frame, and means for adjusting said hoe carrying frame to move the hoes to operative or inoperative position.

Still another object of my invention is to provide a machine of the above character which is strong and durable in construction, very efficient in practical use and one which may be easily and quickly operated.

With the above and other objects in view, the invention consists of the novel features of construction, combination and arrangement of parts hereinafter fully described and claimed, and illustrated in the accompanying drawings, in which—

Figure 1 is a side elevation of a cotton chopping machine embodying my improvements; Fig. 2 is a view similar to Fig. 1 showing the hoes in their inoperative position; Fig. 3 is a plan view; Fig. 4 is a section taken on the line 4—4 of Fig. 3, and Fig. 5 is a section taken on the line 5—5 of Fig. 3.

Referring more particularly to the drawings 5 designates the main frame which is mounted upon the front and rear wheel axles 6 and 7 respectively. The front wheel axle is of substantially U-shape form and upon the ends thereof the forward ground wheels 8 are revolubly mounted. The rear supporting wheels 9 are also mounted rigidly upon the axle 7 which is suitably mounted in bearings fixed to the main frame. The main frame 5 is substantially rectangular in form and the forward end thereof has secured to the same the diagonal braces 10. These braces are rigidly secured to opposite sides of the bar 11, said bar being suitably mounted upon the intermediate portion of the U-shaped axle 6 through which the king bolt 12 upon which said axle is mounted extends. The tongue 13 is connected to the vertical end portions of the axles 6 by means of the bars 14 and upon this tongue suitable draft connections 15 are mounted.

A hoe carrying frame is movably mounted in the main wheel supported frame 5 and comprises the transversely disposed end bars 16 which at one of their ends are loosely connected to one of the longitudinal side bars of the main frame as shown at 17. The other ends of these bars are downwardly bent at an agle as at 18 and are connected by means of a longitudinal bar 19, the ends of which are secured to the bars 16. Bearings 20 are centrally mounted upon the transverse frame bars 16 and support the longitudinally disposed hoe shaft 21 which is adjustable therein. A beveled pinion 22 is fixed upon the rear end of this shaft and meshes with a crown gear 23 which is fixed upon the rear wheel axle 7. To the longitudinal shaft 21 a plurality of hoes 24 are secured. These hoes are adjustable on the shaft and are adapted to be rigidly secured in position by means of the plates 25 which extend over the hoe carrying shanks and have their ends disposed upon the shaft 21. Clip bolts 26 are arranged over the ends of the plates 25 and have their ends connected by means of the plates 27 in the usual manner. Nuts are threaded upon the ends of the bolt to engage said plates and rigidly hold the bolts in clamping engagement upon the plate 25.

The hoe carrying frame is adapted to be adjusted in the main frame by means of a manually shiftable lever 28 which is pivotally mounted upon a rack 29, said lever carrying the usual spring pressed dog for engagement with the teeth of the rack to hold the lever in its adjusted position. The lower portion of this adjusting lever extends below the connecting bar 19 of the hoe carrying frame and is connected thereto by means of a link 30. This link is pivoted to the lever and to the frame and at its lower end is provided with a plurality of openings 31 whereby the lever may be adjustably connected to said link. By connecting the lever and frame in this manner the operation of the device will be obvious. Upon the driver shifting the lever 28 rearwardly to the position indicated in Fig. 2, the hoe carrying frame will be moved upwardly and also longitudinally to a sufficient extent to disengage the pinion 22 from the gear 23, thereby discontinuing the rotation of the hoe shaft 21. In this manner the hoes are simultaneously elevated out of contact with the ground surface and their rotation stopped so that the machine may be driven from the field without danger of damage to the hoe blades by contact with obstructions. The usual driver's seat 32 is mounted upon the rear of the main frame 5 in position for the convenient manipulation of the adjusting lever 28. A rein guide or support 33 is also preferably provided to avoid liability of the hoe blades contacting with and cutting the driving reins.

From the foregoing it is thought that the construction and operation of my improved cotton chopping machine will be readily understood. The adjustment of the hoes may be easily and quickly accomplished so as to readily move the same to their operative and inoperative positions, for the thinning of the cotton rows at the proper points. Comparatively few parts are employed in the construction, and it will be seen that the machine as a whole is rendered very durable and efficient in operation.

While I have shown and described the preferred construction and arrangement of the various elements, it will be understood that the machine is susceptible of considerable modification without departing from the essential feature or sacrificing any of the advantages thereof.

Having thus described the invention what is claimed is:—

1. The combination with a wheel supported frame, of a hoe carrying frame pivotally connected to and longitudinally movable upon one side of the main frame, a shaft rotatably mounted in the movable frame, a plurality of hoes adjustably secured on the shaft, a gear rigidly fixed to one of the wheel axles, a pinion on said shaft meshing with said gear, and manually operable means mounted upon the main frame and connected to said movable frame to move said frame vertically and longitudinally in the main frame and dispose the hoes in their operative or inoperative positions.

2. The combination with a main wheel supported frame, a hoe carrying frame comprising transverse bars pivotally and slidably connected at one of their ends to one side of the main frame, a longitudinal bar connecting the other ends of the transverse bars, a hoe carrying shaft mounted upon the transverse bars, a plurality of hoes fixed on said shaft, operating connections between one of the wheel axles and said shaft to rotate the latter, a manually shiftable lever mounted upon the main frame, a link pivotally connected to the hoe carrying frame and adjustably connected to one end of said lever, the shifting of said lever moving the frame vertically and longitudinally in the main frame to connect and disconnect the driving connections between the wheel axle and the hoe shaft and to dispose the hoe blades above the ground surface, and means for retaining the shiftable lever in its adjusted position.

In testimony whereof I hereunto affix my signature in the presence of two witnesses.

WALTER HUGH LYNN.

Witnesses:
J. B. WALLACE,
J. W. COLEMAN.

---

Copies of this patent may be obtained for five cents each, by addressing the "Commissioner of Patents, Washington, D. C."